(12) United States Patent
Goldenberg et al.

(10) Patent No.: US 7,631,106 B2
(45) Date of Patent: Dec. 8, 2009

(54) PREFETCHING OF RECEIVE QUEUE DESCRIPTORS

(75) Inventors: Dror Goldenberg, Zichron Yaakov (IL); Eyal Rond, Haifa (IL); Tomer Ben-David, Modiin (IL)

(73) Assignee: Mellanox Technologies Ltd., Yokneam (IL)

( * ) Notice: Subject to any disclaimer, the term of this patent is extended or adjusted under 35 U.S.C. 154(b) by 1595 days.

(21) Appl. No.: 10/218,605

(22) Filed: Aug. 15, 2002

(65) Prior Publication Data

US 2004/0034718 A1    Feb. 19, 2004

(51) Int. Cl.
*G06F 15/16* (2006.01)
(52) U.S. Cl. .................. 709/250; 709/230; 709/231; 709/232; 709/233; 709/234; 709/235; 709/236; 709/237; 709/243
(58) Field of Classification Search ......... 709/230–237, 709/243, 250
See application file for complete search history.

(56) References Cited

U.S. PATENT DOCUMENTS 5,509,123 A * 4/1996 Dobbins et al. ............ 709/243
6,360,220 B1 * 3/2002 Forin ............................ 707/8
6,389,479 B1 * 5/2002 Boucher et al. ............. 709/243
6,807,581 B1 * 10/2004 Starr et al. .................. 709/250
7,152,122 B2 * 12/2006 Kagan et al. ................ 709/250
2001/0037406 A1 * 11/2001 Philbrick et al. ............ 709/250
2001/0049755 A1 * 12/2001 Kagan et al. .................. 710/22
2002/0165899 A1 * 11/2002 Kagan et al. ................ 709/104

OTHER PUBLICATIONS

InfiniBand™ Architecture Specification vol. 1 Release 1.0, Oct. 24, 2000. (Available at: www.infinibandta.org).

* cited by examiner

*Primary Examiner*—Liangche Alex Wang
(74) *Attorney, Agent, or Firm*—Mark M. Friedman

(57) ABSTRACT

A method for receiving messages containing data conveyed over a network, using a network adapter coupled to a computing device having a system memory associated therewith. At least one queue of descriptors is generated in the system memory, each such descriptor indicating a disposition of the data contained in the messages to be received over the network. At least one of the descriptors is prefetched from the at least one queue in the system memory to a cache memory in the network adapter. When one of the messages is received at the network adapter, the adapter processes the at least one of the received messages so as to cause the data contained therein to be distributed in accordance with the at least one prefetched descriptor in the cache memory.

29 Claims, 6 Drawing Sheets

PREFETCHING OF RECEIVE QUEUE DESCRIPTORS

FIELD OF THE INVENTION

The present invention relates generally to digital network communications, and specifically to network adapters for interfacing between a computing device and a packet data network.

BACKGROUND OF THE INVENTION

The computer industry is moving toward fast, packetized, serial input/output (I/O) bus architectures, in which computing hosts and peripherals are linked by a switch network, commonly referred to as a switch fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Dell and Microsoft). The IB architecture is described in detail in the *InfiniBand Architecture Specification*, Release 1.0 (October, 2000), which is incorporated herein by reference. This document is available from the InfiniBand Trade Association at www.infinibandta.org.

Computing devices (hosts or peripherals) connect to the IB fabric via a network interface adapter, which is referred to in IB parlance as a channel adapter. The IB specification defines both a host channel adapter (HCA) for connecting a host processor to the fabric, and a target channel adapter (TCA), intended mainly for connecting peripheral devices to the fabric. Typically, the channel adapter is implemented as a single chip, with connections to the computing device and to the network. Client processes running on a computing device communicate with the transport layer of the IB fabric by manipulating a transport service instance, known as a "queue pair" (QP), made up of a send work queue and a receive work queue. The IB specification permits the HCA to allocate as many as 16 million ($2^{24}$) QPs, each with a distinct queue pair number (QPN). A given client process (referred to simply as a client) may open and use multiple QPs simultaneously.

To send and receive communications over the network, the client initiates work requests (WRs), which cause work items, called work queue elements (WQEs), to be placed in the appropriate queues. The channel adapter then executes the work items, so as to communicate with the corresponding QP of the channel adapter at the other end of the link. In both generating outgoing messages and servicing incoming messages, the channel adapter uses context information pertaining to the QP carrying the message. The QP context is created in a memory accessible to the channel adapter when the QP is set up, and is initially configured with fixed information such as the destination address, negotiated operating limits, service level and keys for access control. Typically, a variable part of the context, such as the current packet sequence number (PSN) and information regarding the WQE being serviced by the QP, is subsequently updated by the channel adapter as it sends and receives messages. After it has finished servicing a WQE, the channel adapter may write a completion queue element (CQE) to a completion queue, to be read by the client.

The QP that initiates a particular operation, i.e. injects a message into the fabric, is referred to as the requester, while the QP that receives the message is referred to as the responder. An IB operation is defined to include a request message generated by the requester and, as appropriate, its corresponding response generated by the responder. (Not all request messages have responses.) Each message consists of one or more IB packets. A given channel adapter is typically configured to serve simultaneously both as a requester, transmitting requests and receiving responses on behalf of local clients, and as a responder, receiving requests from other channel adapters and returning responses accordingly.

IB request messages include, inter alia, remote direct memory access (RDMA) write and send requests, RDMA read requests, and atomic read-modify-write requests. Both RDMA write and send requests cause the responder to write data to a memory address at its own end of the link. Whereas RDMA write requests specify the address in the remote responder's memory to which the data are to be written, send requests rely on the responder to determine the memory location at the request destination. Therefore, to process incoming send requests, the destination computing device must generate receive WQEs and place them in the proper receive queues in its memory. Each receive WQE includes a scatter list indicating a location or locations available in the memory of the destination computing device. Whenever a valid send request is received, the destination channel adapter takes the next WQE from the receive queue and places the received data in the memory location(s) specified in the scatter list of that WQE. Typically, the channel adapter then places a CQE on the completion queue, indicating to the computing device that the receive operation was completed. Thus, every valid incoming send request engenders a receive queue operation by the remote responder.

SUMMARY OF THE INVENTION

It is an object of some aspects of the present invention to provide an efficient mechanism for handling incoming send requests, as well as network adapters that implement such a mechanism.

In preferred embodiments of the present invention, a network adapter, which is coupled to a computing device, comprises a cache for holding descriptors placed on its receive queues by the computing device. Each descriptor corresponds to a work item, and indicates the disposition of data in a message to be received by the network adapter. Typically, the network adapter comprises a channel adapter, which links the computing device to an InfiniBand (IB) switch fabric, the work items are WQEs, and the computing device maintains multiple receive queues for multiple queue pairs that it uses.

The descriptors are used by the network adapter in processing messages that it receives over the network from remote requesters, such as IB send messages, which contain data to be written to a system memory of the computing device without specifying the memory addresses to which the data should be written. To process such a message, the network adapter reads the appropriate descriptor from its cache, and then transfers the message data to the system memory location indicated by the descriptor. The network adapter then prefetches the next descriptor from the appropriate receive queue into its cache, for use in processing the next incoming message of this sort.

By prefetching and caching descriptors in this manner, the network adapter is able to reduce the latency that may occur in processing of incoming request messages. For each incoming request message that carries data to be written to the local memory and does not specify the address to which the data are to be written, the adapter must typically perform two memory access operations: first to fetch the next work item from the receive queue, and second to write the data to the location specified by the work item. Unless there is a cached receive queue descriptor available, the network adapter input port is typically blocked and cannot receive further messages until these operations have been completed. In preferred embodiments of the present invention, however, the next work item is prefetched to the cache, typically during a time the network adapter is not busy with other operations. Therefore, only a single memory access operation is needed before the input can be unblocked, and the next message can be received. Thus, the network adapter may be able to increase its rate of processing incoming messages under conditions of heavy, bursty traffic.

Although preferred embodiments are described herein with specific reference to IB terminology and conventions, the principles of the present invention may similarly be applied to handling of incoming messages and receive queues in networks of other types. The use of such receive queues and caching of receive queue work items in the network adapter increases the rate at which the computing device served by the network adapter can receive data from the network, while reducing the processing burden imposed on the device to deal with incoming data packets.

There is therefore provided, in accordance with a preferred embodiment of the present invention, a network interface adapter, including a network interface, adapted to send and receive messages containing data over a network, and message processing circuitry, adapted to be coupled to a computing device and to a system memory associated with the computing device and containing at least one queue of one or more descriptors, each such descriptor indicating a disposition of the data contained in the messages to be received over the network. The message processing circuitry includes a cache memory, which is coupled to hold at least one of the descriptors from the at least one queue, and a message processing agent, coupled to prefetch the at least one of the descriptors from the at least one queue in the system memory to the cache memory, and to process at least one of the received messages so as to cause the data contained therein to be distributed in accordance with the at least one prefetched descriptor in the cache memory.

Preferably, the at least one of the descriptors indicates a location in the system memory, and the message processing agent is adapted to cause the data contained in the at least one of the received messages to be written to the location in the system memory indicated by the at least one of the descriptors. Further preferably, the at least one of the descriptors includes a scatter list including a plurality of scatter entries, each such scatter entry indicating a range of addresses in the system memory, and the message processing agent is adapted to cause the data contained in the at least one of the received messages to be scattered to the addresses indicated by the scatter entries. Most preferably, the at least one of the received messages includes a sequence of packets containing the data, and the message processing agent is adapted to cause the data contained in each of the packets in the sequence to be scattered to the addresses indicated by the scatter entries.

Additionally or alternatively, the message processing circuitry includes a direct memory access (DMA) processor, and the message processing agent is adapted, based on the at least one of the descriptors, to generate instructions to the DMA processor to write the data to the addresses indicated by the scatter entries. In a preferred embodiment, the messages received over the network include remote DMA (RDMA) write messages, which specify addresses in the system memory to which the data contained thereby are to be written, and send messages, which do not specify the addresses in the system memory, and the at least one of the received messages processed by the message processing agent includes one or more of the send messages, while the DMA processor is adapted to process the RDMA write messages substantially independently of the message processing agent. Preferably, the network interface is coupled to pass the messages that are received over the network from remote requesters to the DMA processor, and the DMA is coupled to pass the messages that it receives that are not RDMA messages to the message processing agent.

Preferably, the message processing agent is adapted, upon receiving the at least one of the received messages, to determine whether the at least one of the descriptors in the cache memory is a valid descriptor for processing the at least one of the received messages, and if not, to fetch a further one of the descriptors for use in processing the at least one of the received messages. Additionally or alternatively, the message processing agent is adapted to prefetch a succeeding one of the descriptors from the at least one queue for use in processing a subsequent one of the messages, before the subsequent one of the messages is received by the adapter.

In a preferred embodiment, the network interface is adapted to send and receive the messages using a plurality of transport service instances, and the at least one queue includes multiple queues, which are associated respectively with different ones of the transport service instances, and the message processing agent is adapted to prefetch the descriptors from the multiple queues to the cache memory, so that the cache memory holds one of the descriptors for each of two or more of the transport service instances. Typically, the network includes a switch fabric, and the transport services instances include queue pairs used by the computing device in communicating over the switch fabric, and the descriptors include work queue elements placed in the queues by the computing device. Preferably, the cache memory is further adapted to hold context information with respect to each of the two or more of the transport service instances, for use by the message processing agent in processing the received messages. Additionally or alternatively, the cache memory is further adapted to hold, for each of the two or more of the transport service instances, an indication as to whether the descriptor in the cache memory is a valid descriptor for processing the at least one of the received messages on that one of the transport service instances.

There is also provided, in accordance with a preferred embodiment of the present invention, network communication apparatus, including a network interface, adapted to send and receive messages containing data over a network, a system memory, a computing device, coupled to write descriptors to at least one queue held in the system memory, each such descriptor indicating a disposition of the data contained in the messages to be received over the network, and message processing circuitry, coupled between the network interface, the computing device and the system memory. The message processing circuitry includes a cache memory, which is adapted to hold at least one of the descriptors from the at least one queue, and a message processing agent, coupled to prefetch the at least one of the descriptors from the at least one queue in the system memory to the cache memory, and to process at least one of the received messages so as to cause the data contained therein to be written to the system memory in accordance with the at least one prefetched descriptor in the cache memory.

Preferably, the computing device is coupled to generate the at least one queue in the system memory as a cyclic buffer or, alternatively, as a linked list.

There is additionally provided, in accordance with a preferred embodiment of the present invention, a method for receiving messages containing data conveyed over a network to a network adapter coupled to a computing device having a system memory associated therewith. The method includes generating in the system memory at least one queue of one or more descriptors, each such descriptor indicating a disposition of the data contained in the messages to be received over the network, prefetching at least one of the descriptors from the at least one queue in the system memory to a cache memory in the network adapter, receiving at least one of the messages at the network adapter, and processing the at least one of the received messages at the network adapter so as to cause the data contained therein to be distributed in accordance with the at least one prefetched descriptor in the cache memory.

The present invention will be more fully understood from the following detailed description of the preferred embodiments thereof, taken together with the drawings in which:

DETAILED DESCRIPTION OF PREFERRED EMBODIMENTS

Figure 1:
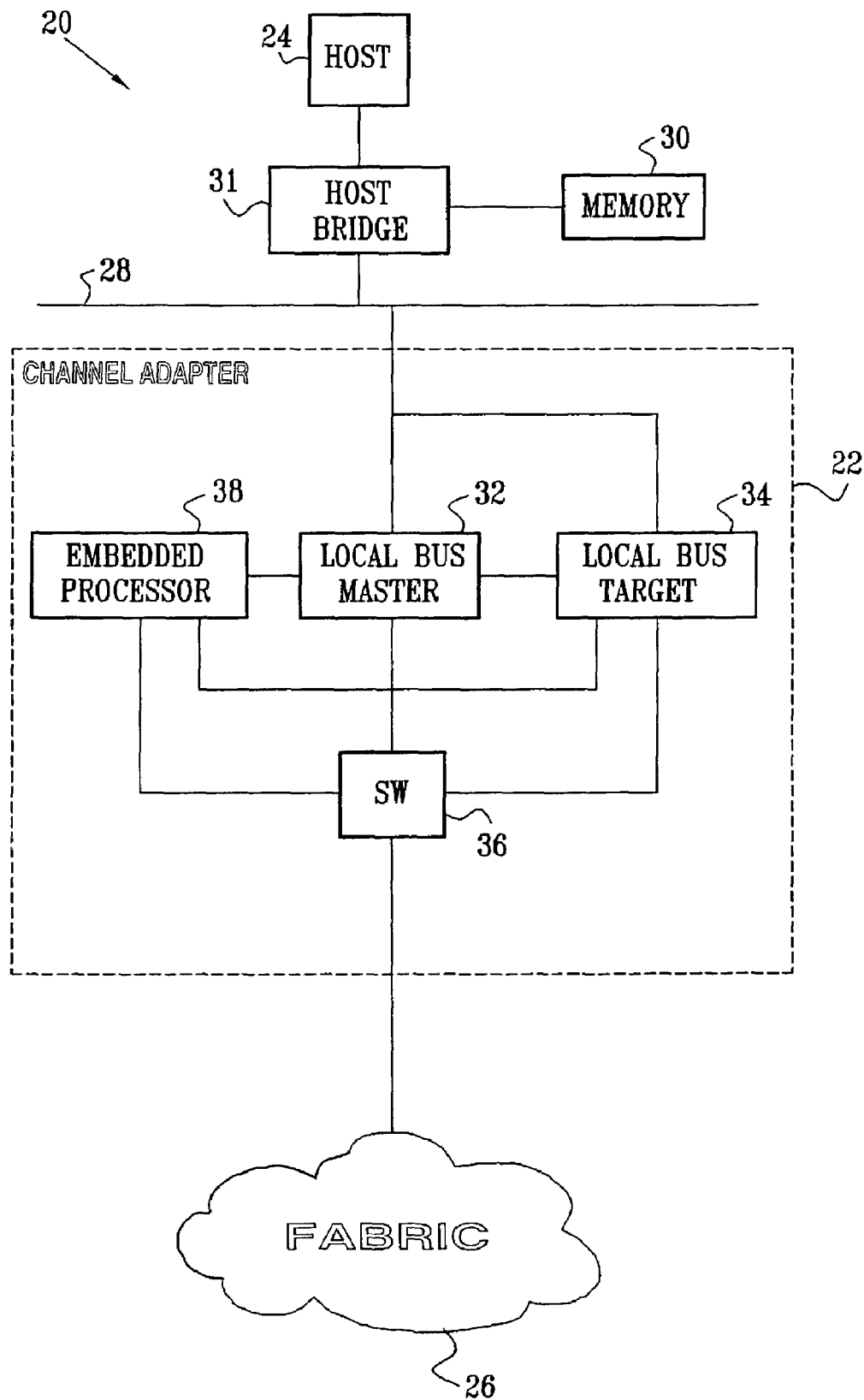
FIG. 1 is a block diagram that schematically illustrates a system for network communications, in accordance with a preferred embodiment of the present invention.

FIG. 1 is a block diagram that schematically illustrates a system 20 for network data communications, in accordance with a preferred embodiment of the present invention. System 20 is built around a channel adapter 22, which links a host processor 24 to a switch fabric 26, preferably an InfiniBand (IB) fabric. Alternatively, channel adapter 22 may similarly link other computing devices, such as input/output and other peripheral devices, to fabric 26. Thus, the features of channel adapter 22 described hereinbelow may be implemented in either a host channel adapter (HCA) or a target channel adapter (TCA). Only those elements of the channel adapter that are necessary to an understanding of the operation of the present invention are shown here. The other elements and functions needed to implement a complete channel adapter will be apparent to those skilled in the art. It will also be understood that although preferred embodiments are described herein using IB conventions and terminology, the principles of the present invention may be applied, mutatis mutandis, to networks of other types.

Host 24 is typically connected to adapter 22 via a local bus 28, as is known in the art, such as a Peripheral Component Interface (PCI) bus. The host is also connected to read from and write to a local system memory 30, typically via a suitable host bridge 31. The channel adapter and memory typically occupy certain ranges of physical addresses in a defined address space on bus 28. In addition to the host operating system, applications and other data, memory 30 typically holds data structures that are accessed and used by adapter 22. These data structures preferably include QP context information and work requests, or descriptors, written by host 24, which correspond to work items, or WQEs, to be carried out by adapter 22.

Adapter 22 comprises a local bus master unit 32 and a local bus target unit 34, coupled to fabric 26 by a switch 36. Local bus master 32 initiates transactions on bus 28 in response to incoming request packets received by adapter 22 over fabric 26. While local bus master 22 is responsible for the responder flow of channel adapter 22, local bus target 34 is responsible for the requester flow (which is beyond the scope of the present patent application). Switch 36 accordingly routes incoming request packets, received from remote requesters on fabric 26, to local bus master 32, while routing incoming response packets, sent by remote responders in reply to requests from adapter 22, to local bus target 34. Alternatively, the local bus master and target of adapter 22 may be connected to fabric 26 via one or more network ports, without the use of an integral switch. It should be understood that implementation of the present invention is not dependent on the particular device configuration shown in FIG. 1, which is described here solely by way of example. Rather, the methods described herein for handling incoming send requests may be adapted for use in a wide range of different channel adapter devices.

As noted earlier, incoming RDMA write request packets contain a destination address generated by the remote requester, indicating the location in memory 30 to which the packet data are to be written. Local bus master 32 is thus able to write the data to memory 30 by direct memory access (DMA) over bus 28, without involvement of host 24. (Local bus target 34 similarly works by DMA, in response to WQEs placed on the send queue in memory 30 by host 24.) On the other hand, incoming send request packets contain no such destination address. Therefore, when local bus master 32 receives a send request message on a given QP, a WQE must be read from the receive queue of the QP in order to determine what should be done with the packet data. This operation is considerably more complicated than receiving a RDMA write request, since it necessitates consulting the QP context to find the location of the next WQE in the receive queue, and then processing the WQE to extract the scatter list.

To process incoming send messages, local bus master 32 invokes an embedded processor 38 to serve as a message processing agent. For the sake of processing speed, local bus master 32 and local bus target 34 are preferably implemented in dedicated hardware logic. Processor 38, on the other hand, typically comprises an embedded microprocessor on the channel adapter chip, most preferably an embedded RISC processor. The processor is programmed in firmware to handle send messages (and may also be programmed to process various special packet types that cannot be handled by the dedicated hardware of local bus master 32). Alternatively, processor 38 may be implemented using programmable or hard-wired logic. Further aspects of the embedded RISC processor in adapter 22 and its use in handling management functions are described in U.S. patent application Ser. No. 09/657,865, filed Sep. 8, 2000, which is assigned to the assignee of the present patent application and whose disclosure is incorporated herein by reference.

Figure 2:
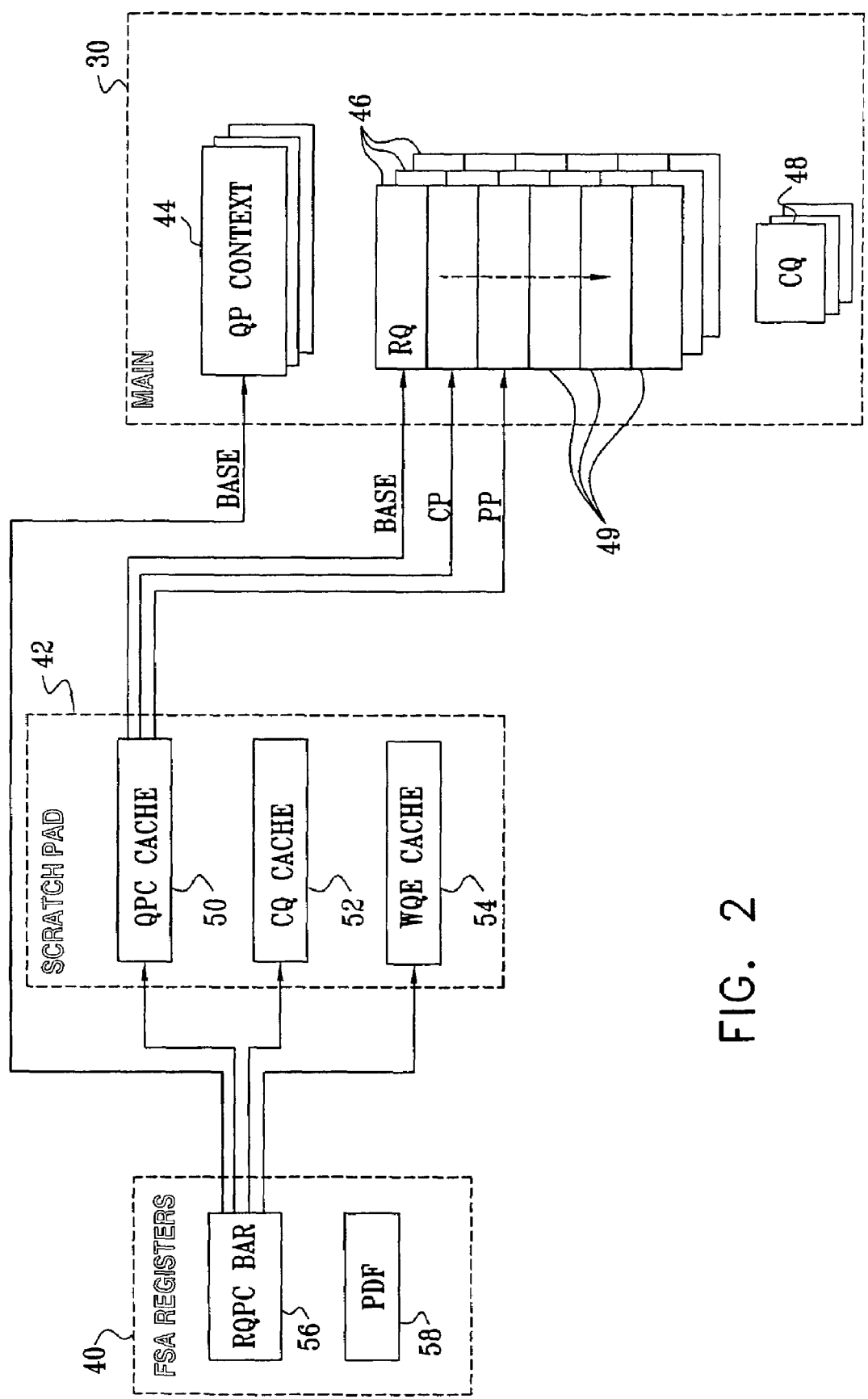
FIG. 2 is a block diagram that schematically shows data structures used in processing messages received over a network, in accordance with a preferred embodiment of the present invention.

FIG. 2 is a block diagram that schematically illustrates data structures used by processor 38 in processing incoming send requests, in accordance with a preferred embodiment of the present invention. These data structures are held in a number of areas of memory, including a register area 40 and a scratchpad memory 42 used by processor 38 on the channel adapter chip (i.e., "on-chip" memory), and system memory 30. For each QP that is open on adapter 22, a QP context table 44 is stored in memory 30. Portions of the QP context used by processor 38 are also cached in a QP context (QPC) cache 50 in scratchpad 42, while other portions used by local bus master 32 are held in a channel lookup table (not shown). Alternatively, the processor and local bus master may share a QP context cache. The QP context indicates whether the corresponding QP is configured to receive incoming send requests, as well as providing information to be used in processing these requests (and other types of requests for which the QP is configured). The QP context includes information that is used in transport checking of incoming packets, such as the current packet and message sequence numbers, as well as keys and addresses for accessing data in memory 30.

For QPs that are configured to receive incoming send messages, QP context table 44 also includes pointers to a receive queue (RQ) 46 and a completion queue (CQ) 48 in memory 30. Typically, a separate receive queue is maintained for each such QP, although multiple QPs may share a completion queue. The receive queue comprises one or more descriptors (or WQEs) 49, which are typically arranged in a cyclic buffer. Alternatively, the receive queue may be arranged as a linked list. Each descriptor is written by host 24 to indicate how channel adapter 22 is to dispose of the data in one of the send messages that it receives. Such a message may comprise one or more packets, depending on the quantity of data and the maximum transfer unit allowed for this QP, as specified in QP context 44. Each descriptor comprises one or more scatter entries, indicating a range of addresses in memory 30 to which adapter 22 should write the data contained in the send message. Preferably, each scatter entry includes a base address and a length of the data to be written beginning at the base address. In addition, descriptor 49 may include other fields, such as a WQE identifier (also referred to as a work request identifier), which are used by software on host 24 to track message processing by adapter 22, as well as flags indicating to adapter 22 whether to generate a CQE and possibly an interrupt to host 24 upon completion of the WQE.

To increase the likelihood that adapter 22 will find a descriptor ready in memory 30 when it needs one, host 24 preferably writes sequences of multiple descriptors 49 to receive queue 46 for each active QP, without waiting for the queue to empty. The host moves a producer pointer (PP) so that it points to the tail of the queue, i.e., to the last descriptor it has created. A consumer pointer (CP) points to the head of the queue and is manipulated by adapter 22 to indicate the next descriptor to be read from the queue. The operation of these pointers is described in greater detail hereinbelow.

In the description of preferred embodiments herein, system memory 30 is assumed to contain both data structures used in operation of adapter 22 and actual message data extracted by the adapter from messages received over fabric 26. The term system memory should be understood broadly to encompass all areas of memory that can be accessed by host 24. Thus, for example, memory 30 may comprise a single area of random access memory (RAM) serving all the purposes described herein, or it may alternatively comprise separate areas for message data and for the data structures shown in FIG. 2.

For efficient handling of incoming send requests, processor 38 holds QP context (QPC) information in cache 50 for each QP that is currently active. Optionally, the processor maintains another cache 52 of completion queue (CQ) context information in scratchpad 42 for one or more CQs that are used by the active QPs. Because of limitations on the size of scratchpad 42 and the large number of QPs that may be supported by fabric 26, there may not be room in the scratchpad for all active QPs. Therefore, when processor 38 receives a send message on a given QP, it checks whether the context information is cached in the scratchpad. If not (a cache miss), it reads the necessary context information from memory 30 and writes it to the scratchpad in place of another QP, preferably one that it has not recently used. Methods for caching of QP context information are described further in U.S. patent application Ser. No. 10/052,413, entitled, "Queue Pair Context Cache," filed Jan. 23, 2002, which is assigned to the assignee of the present patent application and whose disclosure is incorporated herein by reference. Preferably, the processor caches only the portion of the context information that it actually needs for packet processing.

In addition, for each QP that is configured to receive send requests, and whose context is cached in scratchpad 42, processor 38 fetches descriptors 49 to be used from receive queue 46, and places them in a WQE cache 54 in the scratchpad. (Typically, the WQE cache can hold descriptors only for those QPs whose context information is cached in the scratchpad.) The process of fetching (and prefetching) descriptors 49 is described in detail hereinbelow, with reference to FIGS. 4 and 5. For this purpose, processor 38 maintains pointers to receive queue 46 for each QP in the corresponding QP context cache 50. The pointers include a base address of the receive queue, along with the producer and consumer pointers mentioned above, relative to the base address. Each time the processor fetches (or prefetches) a descriptor, it updates the consumer pointer to point to the next entry in the receive queue. From the point of view of the processor, however, the producer pointer is read-only. As mentioned above, this pointer is updated by host 24 when it writes new descriptors to the queue, and indicates to processor 38 when it has exhausted the entries in the queue.

WQE cache 54 preferably has sufficient space to hold one descriptor for each active QP (whose context is present in QP context cache 50), and may optionally have space for multiple descriptor entries per QP. Preferably, processor 38 loads into cache 54 only those fields of the descriptor in memory 30 that it needs in order to process incoming send requests. Other information, such as the WQE identifier, is left behind in receive queue 46. When the processor has prefetched a descriptor into WQE cache 54 and has not yet consumed it, a "WQE valid" flag is set in QP context cache 50 to reflect this situation.

As noted above, a single descriptor may comprise multiple scatter entries (each having a base address and length), and can be used by processor in processing multiple packets in a single send message. Therefore, the QP context in cache 50 preferably also contains pointers maintained by the processor to indicate which of the scatter entries it is using in the current descriptor, and how much of the length provided by the scatter entry has been consumed.

In order to keep track of the locations of the QP context and other cache entries in scratchpad 42, processor 38 maintains a responder QP context base address register (RQPC BAR) 56 in register area 40. This register preferably contains the base address of QP context table 44 in system memory 30, as well as the offsets of caches 50, 52 and 54 in scratchpad 42. Preferably, register 56 also contains other configuration details, such as the maximum number of QPs and CQs that can be handled and the sizes of the caches in the scratchpad.

Processor 38 also maintains a pending descriptor fetch (PDF) register 58 in register area 40, in which it keeps track of the state of descriptor fetches (and prefetches) from receive queues 46 in memory 30. In the device configuration shown in FIG. 1, processor 38 fetches or prefetches a descriptor 49 from memory 30 by sending a RDMA read request through local bus master 32 on a special-purpose QP. Although this method of retrieving data from memory 30 is useful here, in other configurations processor 38 may simply access memory 30 directly via bus 28, or it may use a DMA engine that is available for this purpose. Hardware-based implementations (without the use of an embedded microprocessor) are also possible. PDF register 58 holds the numbers of the QPs for which descriptors are currently being fetched and the packet sequence numbers (PSN) of the corresponding RDMA read requests. It uses this information in processing the RDMA read responses containing the descriptors, which are returned by local bus master 32 through switch 36 to the processor. In the simplest implementation, PDF register 58 and adapter 22 are configured so that only one fetch or prefetch operation can be in progress at any given time, but multi-fetch designs may be used as well, at the expense of slightly greater complexity.

PDF register 58 also contains flags, including a valid flag and a prefetch flag. The valid flag is set to indicate that a fetch/prefetch operation is in progress. This prefetch flag is set to indicate that the requested descriptor is not yet needed for processing an incoming send message, and is cleared to indicate that the descriptor is needed urgently to process a packet waiting at switch 36. When multiple simultaneous fetch/prefetch operations are allowed, the PDF register preferably contains valid and prefetch flags for each QP that is being serviced. The PDF register may have additional fields to be used for tracking multiple fetch or prefetch operations that are in progress simultaneously on a single QP.

Figure 3:
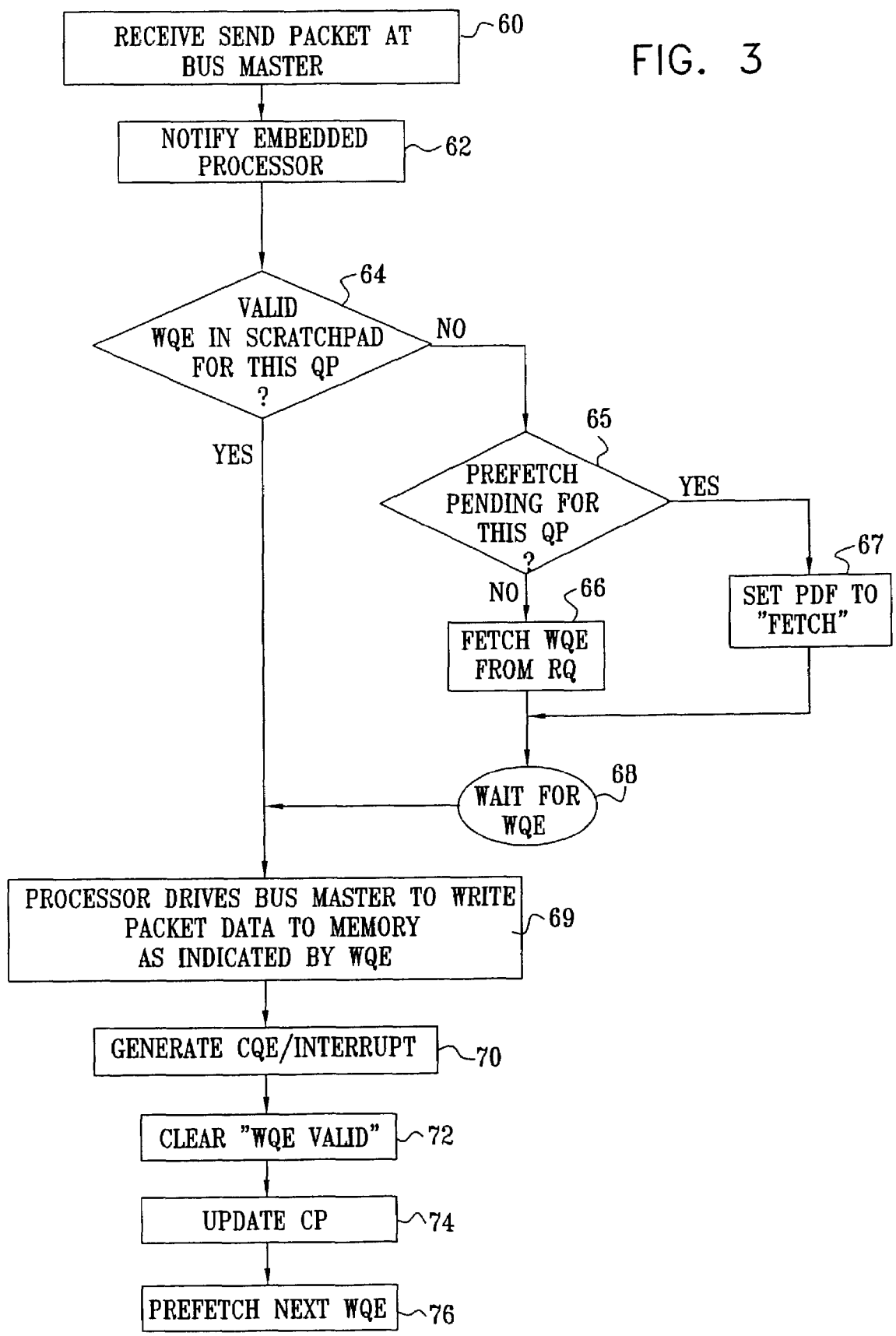
FIG. 3 is a flow chart that schematically illustrates a method for processing message packets received by a network adapter, in accordance with a preferred embodiment of the present invention.

FIG. 3 is a flow chart that schematically illustrates a method used by adapter 22 in processing incoming send request packets, in accordance with a preferred embodiment of the present invention. The method is invoked when local bus master 32 receives a valid incoming send packet, at a packet input step 60. Local bus master 32 preferably performs basic transport checks (for example, to validate the QPN ad PSN), and then passes the packet to processor 38 for further processing, at a processor notification step 62. The processor checks that the packet is indeed a valid send packet, and if so, it proceeds with send processing. If the context information for this QP is not present in cache 50, the processor invokes a cache replacement, to copy the necessary context information from table 44 in memory 30 to the appropriate locations in scratchpad 42, as described above.

Processor 38 checks the WQE valid flag in QP context cache 50 to determine whether there is a valid, unused descriptor available for this QP in WQE cache 54, at a descriptor validity checking step 64. If not, the processor checks PDF 58 to determine whether there is already a prefetch operation in progress for this QP, at a prefetch checking step 65. If the finding at this step is negative, as well, a descriptor must be fetched from receive queue 46, at a descriptor fetching step 66. This step is described in detail hereinbelow with reference to FIG. 4. If there is already a prefetch operation pending, it is not necessary to initiate a new fetch. Instead, processor 38 simply resets the prefetch flag in PDF 58, to change the status of the pending operation from a prefetch to a fetch, at a PDF setting step 67. Following either step 66 or 67, processor 38 waits until the descriptor has been returned from memory 30 before proceeding any further, at a waiting step 68.

When there is a valid descriptor present in cache 54 (following either step 64 or step 68), processor 38 processes the send packet using the scatter list provided by the descriptor, at a packet processing step 69. To accomplish this task in the device configuration shown in FIG. 1, the processor parses the descriptor to determine the addresses in memory 30 to which the data in the packet payload are to be written. The processor then preferably generates RDMA write packets containing the data and directed to the addresses it has determined. It inputs these packets to local bus master 32 via a special service channel, causing the local bus master to write the data to the proper locations in memory 30. Finally, based on the data in the original send packet header that it received, the processor sends a RDMA write packet containing no data to local bus master 32 on the original QP on which the send packet was received. This dummy packet causes local bus master 32 to update its transport checking information (such as the packet sequence number) to the appropriate value and to send an acknowledgment packet to the remote requester, if required.

Generation of RDMA write packets by processor 38 in this manner is a convenient way of using the resources of adapter 22 to input packet data to memory 30 for the specific device architecture of channel adapter 22. Alternatively, as noted above, processor 38 may write the packet data directly to memory 30 via bus 28, or it may use a DMA engine that is available in the channel adapter for this purpose. Other mechanisms may also be used for writing the send data to memory 30, as will be apparent to those skilled in the art.

As noted above, a given send message that is received over fabric 26 by adapter 22 may comprise a sequence of multiple packets, and the descriptor in WQE cache 54 may be used by processor 38 to process some or all of the packets in the sequence. Therefore, processor 38 preferably checks each send packet it receives to determine whether it is the first (or only) packet in a message or whether it is an intermediate (middle) or final (last) packet. For the first or only packet in a message, the scatter entry pointers in the QP context in cache 50 must point to the beginning of the first scatter entry in the current descriptor. For subsequent packets, the pointer must point to a later point in the descriptor. When these conditions are not met, the processor considers the send packet to be an invalid request. After processing each send packet, up to the last one in the message, the processor updates the scatter entry pointers in cache 50.

After processing the last packet in a send message, processor 38 may write a CQE to completion queue 48 in memory 30, at a completion step 70. Whether or not the processor actually generates a CQE depends on whether the completion flag is set in the descriptor that the processor has used in cache 54, as described above. Depending on the status of the completion queue, an interrupt may be sent to host 24 when the CQE is written. Processor 38 then clears the WQE valid flag in cache 50, indicating that there is no longer a valid descriptor for this QP, at a flag clearing step 72.

To advance to the next descriptor 49 in receive queue 46, processor 38 increments the consumer pointer, at a pointer update step 74. It then attempts to prefetch the next descriptor from queue 46, in preparation for processing the next send packet that will arrive on this QP, at a prefetching step 76. The processor is able to perform this prefetch when it has finished processing one send message and is not yet busy in processing another message (either on the same QP or on a different QP). Processing incoming send packets that have actually been received by local bus master 32 takes priority over prefetching. When there are no send packets waiting for service, however, the processor can take advantage of the situation to load WQE cache 54 in advance, and thus reduce the latency that will be incurred in processing the next send packet that arrives on this QP. The prefetching process of step 76 is shown in detail below in FIG. 5.

Figure 4:
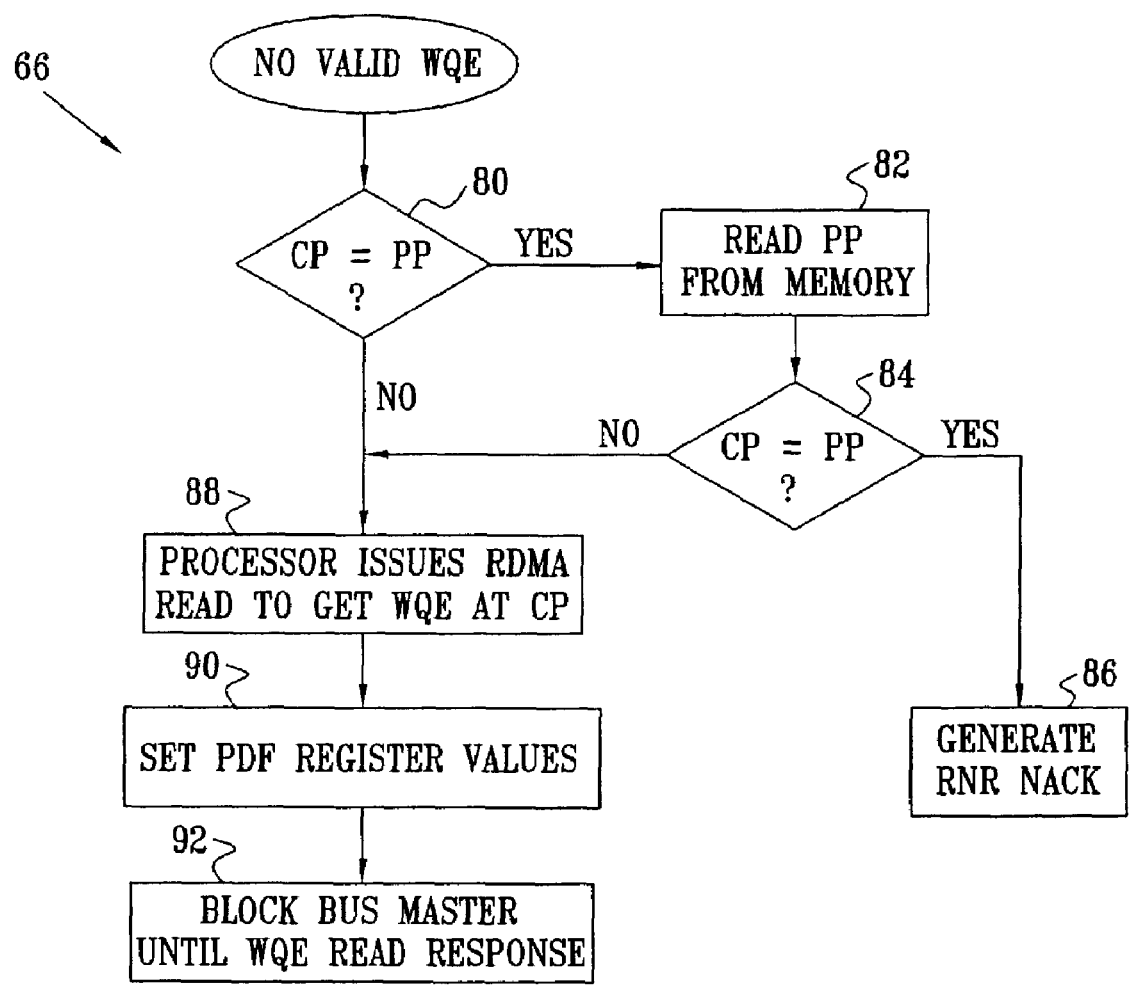
FIG. 4 is a flow chart that schematically illustrates a method for fetching descriptors from a receive queue, in accordance with a preferred embodiment of the present invention.

FIG. 4 is a flow chart that schematically shows details of descriptor fetching step 66, in accordance with a preferred embodiment of the present invention. This step is invoked, as noted above, when a send packet is received on some QP, and there is no valid descriptor for the QP in WQE cache 54 and no prefetch operation already pending.

Before proceeding to fetch a new descriptor, processor 38 checks the values of the consumer and producer pointers that point to receive queue 46, at a pointer checking step 80. These pointers are held in QP context cache 50, as noted above. If the values of the two pointer are equal, processor 38 attempts to update the copy of the producer pointer in the cache by reading the current pointer value from QP context table 44 in memory 30, at a producer pointer update step 82. Only host 24 is allowed to update the actual producer pointer, when it writes new descriptors 49 to queue 46. processor 38 checks the new producer pointer value that it has copied against the consumer pointer value, at a pointer rechecking step 84. If the producer pointer is still equal to the consumer pointer, it means the host has not added any new descriptors to the queue, and there are thus no more valid (unused) descriptors available. In this case, processor 38 returns a "receiver not ready" (RNR) NACK response to the requester that sent the send packet over fabric 26. The send packet cannot currently be serviced by adapter 22, but the requester may retry the send later if desired.

Assuming the consumer and producer pointer values are not equal at either step 80 or step 84, processor 38 passes a RDMA read packet to local bus master 32, requesting the descriptor data from the location in queue 46 indicated by the consumer pointer, at a read request step 88. (As noted above, if adapter 22 is appropriately configured, the processor may alternatively access memory 30 directly or by invoking a DMA engine.) The processor sets the values in PDF register 58 to contain the QP and packet sequence numbers corresponding to the RDMA read request, and clears the prefetch flag in the PDF register, at a register setting step 90. It then waits for local bus master 32 to return a read response packet with the new descriptor. In the meanwhile, local bus master 32 is typically blocked and cannot receive further packets.

Figure 5:
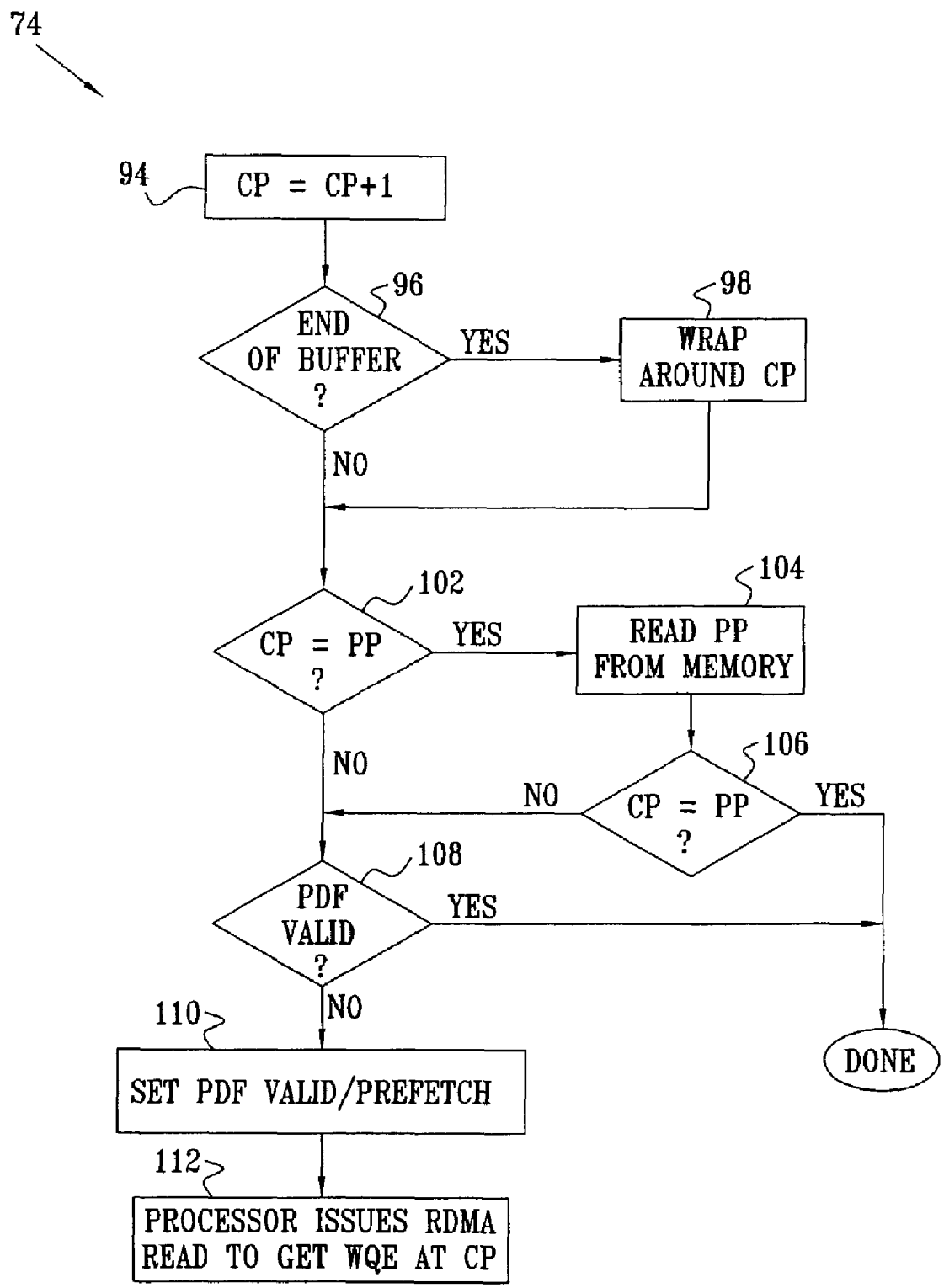
FIG. 5 is a flow chart that schematically illustrates a method for prefetching descriptors from a receive queue, in accordance with a preferred embodiment of the present invention.

FIG. 5 is a flow chart that schematically shows details of pointer update step 74 and prefetching step 76, in accordance with a preferred embodiment of the present invention. Processor 38 begins step 74 by incrementing the consumer pointer for this QP, at an incrementation step 94. Assuming receive queues 46 are maintained as cyclic buffers, the processor checks whether the pointer has reached the end of the buffer, at a buffer checking step 96. If so, the pointer is looped back to the beginning of the buffer, at a wrap around step 98.

Before requesting a new descriptor from memory 30 at step 76, processor 38 checks whether the consumer and producer pointer values in cache 50 are now equal, at a prefetch pointer checking step 102. If the values are equal, the processor reads the producer pointer value from memory 30, at a prefetch pointer reading step 104, and then repeats the pointer comparison, at a prefetch pointer rechecking step 106. These steps are substantially similar to steps 80, 82 and 84 described above. In the present case, however, if the processor determines at step 106 that the consumer and producer pointer values are equal, it simply terminates the prefetch process, since there are no new descriptors available for prefetching.

In addition, before requesting the new descriptor, processor 38 checks whether the valid flag for this QP is set in PDF register 58, at a PDF checking step 108. If this flag is set, it means that there is already a prefetch operation in progress for this QP. In this case, too, the prefetch process may terminate. This behavior assumes that WQE cache 54 holds only a single descriptor for each QP. If a larger WQE cache is provided, processor 38 will proceed to prefetch the next descriptor until the WQE cache is full of valid descriptors. Alternatively, processor 38 may be programmed to prefetch multiple descriptors simultaneously, all for the same QP or for multiple different QPs.

Assuming there is no valid descriptor currently in WQE cache 54, processor 38 sets the valid and prefetch flags in PDF register 58, at a flag setting step 110. As noted above, setting these flags indicates that the processor is in the midst of prefetching a new descriptor into cache 54. The processor then sends a RDMA read packet to local bus master 32, requesting descriptor 49 from receive queue 46 at the point indicated by the consumer pointer, at a prefetch read request step 112.

Figure 6:
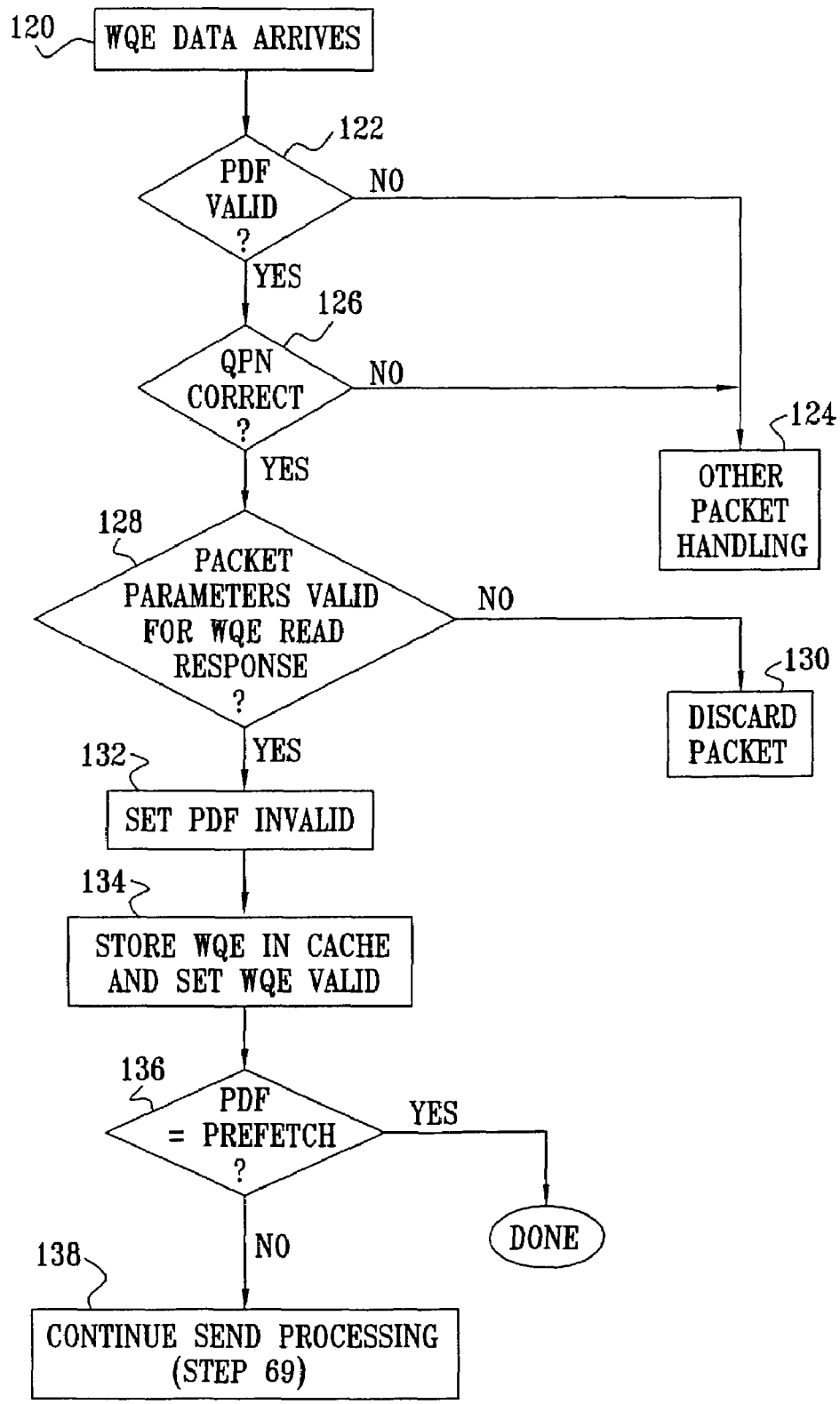
FIG. 6 is a flow chart that schematically illustrates a method for handling descriptors fetched from a receive queue, in accordance with a preferred embodiment of the present invention.

FIG. 6 is a flow chart that schematically illustrates a method by which processor 38 processes RDMA read response packets carrying descriptors 49, in accordance with a preferred embodiment of the present invention. Note again that this method is specific to the device configuration shown in FIG. 1, and in other configurations, processor 38 may read data from memory 30 directly or by DMA. The method of FIG. 6 is used for processing both descriptors that are fetched at step 66 and descriptors that are prefetched at step 76. The differences in handling of these two situations are noted below.

Processor 38 preferably has an input connected to a dedicated port of switch 36, to which local bus master 32 directs its read responses in reply to the RDMA read requests that the processor uses to fetch descriptors from memory 30. This input of the processor is also used for packets of other types, for functions that are beyond the scope of this patent application. The method of FIG. 6 is initiated when processor 38 receives a packet at its input from switch 36, at a packet input step 120. In order to ascertain whether the packet could be a read response packet carrying descriptor data, the processor checks the valid flag in PDF register 58, at a flag checking step 122. If the flag is invalid, it means that there is no descriptor fetch or prefetch outstanding. Therefore, the packet is handled by other processes that run on the processor for purposes other than send message processing, at a packet handling step 124. Similarly, the processor may find that the PDF flag is valid, but the destination QP number of the packet does not correspond to the QP used for fetching and prefetching descriptors, at a QP checking step 126. In this case, too, processing passes to step 124.

If the packet successfully passes steps 122 and 126, the processor checks other packet header parameters to determine whether this packet actually contains the desired descriptor, at a parameter checking step 128. Typically, the processor checks that the packet is indeed a RDMA read response, that the packet sequence number matches the value in PDF register 58, and that the packet payload length is the correct length for a receive queue descriptor. If not, the packet is discarded, at a discard step 130.

Once processor 38 has determined that this packet is, indeed, the desired RDMA read response, it clears the valid flag in PDF register 58, at a flag clearing step 132, indicating that the fetch or prefetch operation has been completed. It then stores the descriptor in the appropriate WQE cache 54 for the QP to which this descriptor belongs, at a caching step 134, and sets the WQE valid flag in QP context cache 50. The processor next checks whether the prefetch flag is set in the PDF register, at a prefetch checking step 136. If so, the process shown here is finished, and processor simply waits for the next send packet to arrive (meanwhile doing other jobs, such as prefetching descriptors for others QPs). If the prefetch flag in the PDF register is cleared, however, it means that local bus master 32 has received a send packet, which is waiting for processor 38 to continue processing it, at a continued processing step 138. In this case, processing continues at step 69 (FIG. 3).

Although preferred embodiments are described herein with reference to a particular network adapter architecture and using conventions associated with IB switch fabrics and devices, the principles of the present invention may also be applied in the context of data communication networks and adapter devices of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface adapter, comprising a network interface, adapted to send and receive messages containing data over a network; and message processing circuitry, adapted to be coupled to a computing device and to a system memory associated with the computing device and containing at least one queue of one or more descriptors, each such descriptor indicating a disposition of the data contained in the messages to be received over the network, the message processing circuitry comprising:

a cache memory, which is coupled to hold at least one of the descriptors from the at least one queue; and a message processing agent, coupled to fetch or prefetch the at least one of the descriptors from the at least one queue in the system memory to the cache memory, and to process at least one of the received messages so as to cause the data contained therein to be distributed in accordance with the at least one prefetched descriptor in the cache memory.

2. An adapter according to claim 1, wherein the at least one of the descriptors indicates a location in the system memory, and wherein the message processing agent is adapted to cause the data contained in the at least one of the received messages to be written to the location in the system memory indicated by the at least one of the descriptors.

3. An adapter according to claim 2, wherein the at least one of the descriptors comprises a scatter list comprising a plurality of scatter entries, each such scatter entry indicating a range of addresses in the system memory, and wherein the message processing agent is adapted to cause the data contained in the at least one of the received messages to be scattered to the addresses indicated by the scatter entries.

4. An adapter according to claim 3, wherein the at least one of the received messages comprises a sequence of packets containing the data, and wherein the message processing agent is adapted to cause the data contained in each of the packets in the sequence to be scattered to the addresses indicated by the scatter entries.

5. An adapter according to claim 2, wherein the message processing circuitry comprises a direct memory access (DMA) processor, and wherein the message processing agent is adapted, based on the at least one of the descriptors, to generate instructions to the DMA processor to write the data to the addresses indicated by the scatter entries.

6. An adapter according to claim 5, wherein the messages received over the network comprise remote DMA (RDMA) write messages, which specify addresses in the system memory to which the data contained thereby are to be written, and send messages, which do not specify the addresses in the system memory, and wherein the at least one of the received messages processed by the message processing agent comprises one or more of the send messages, while the DMA processor is adapted to process the RDMA write messages substantially independently of the message processing agent.

7. An adapter according to claim 6, wherein the network interface is coupled to pass the messages that are received over the network from remote requesters to the DMA processor, and wherein the DMA is coupled to pass the messages that it receives that are not RDMA messages to the message processing agent.

8. An adapter according to claim 1, wherein the message processing agent is adapted, upon receiving the at least one of the received messages, to determine whether the at least one of the descriptors in the cache memory is a valid descriptor for processing the at least one of the received messages, and if not, to fetch a further one of the descriptors for use in processing the at least one of the received messages.

9. An adapter according to claim 1, wherein the message processing agent is adapted to prefetch a succeeding one of the descriptors from the at least one queue for use in processing a subsequent one of the messages, before the subsequent one of the messages is received by the adapter.

10. An adapter according to claim 1, wherein the network interface is adapted to send and receive the messages using a plurality of transport service instances, and wherein the at least one queue comprises multiple queues, which are associated respectively with different ones of the transport service instances, and wherein the message processing agent is adapted to prefetch the descriptors from the multiple queues to the cache memory, so that the cache memory holds one of the descriptors for each of two or more of the transport service instances.

11. An adapter according to claim 10, wherein the network comprises a switch fabric, and wherein the transport services instances comprise queue pairs used by the computing device in communicating over the switch fabric, and wherein the descriptors comprise work queue elements placed in the queues by the computing device.

12. An adapter according to claim 10, wherein the cache memory is further adapted to hold context information with respect to each of the two or more of the transport service instances, for use by the message processing agent in processing the received messages.

13. An adapter according to claim 10, wherein the cache memory is further adapted to hold, for each of the two or more of the transport service instances, an indication as to whether the descriptor in the cache memory is a valid descriptor for processing the at least one of the received messages on that one of the transport service instances.

14. Network communication apparatus, comprising:

a network interface, adapted to send and receive messages containing data over a network;

a system memory;

a computing device, coupled to write descriptors to at least one queue held in the system memory, each such descriptor indicating a disposition of the data contained in the messages to be received over the network; and message processing circuitry, coupled between the network interface, the computing device and the system memory, and comprising:
- a cache memory, which is adapted to hold at least one of the descriptors from the at least one queue; and
- a message processing agent, coupled to fetch or prefetch the at least one of the descriptors from the at least one queue in the system memory to the cache memory, and to process at least one of the received messages so as to cause the data contained therein to be written to the system memory in accordance with the at least one prefetched descriptor in the cache memory.

15. Apparatus according to claim 14, wherein the computing device is coupled to generate the at least one queue in the system memory as a cyclic buffer.

16. Apparatus according to claim 14, wherein the computing device is coupled to generate the at least one queue in the system memory as a linked list.

17. A method for receiving messages containing data conveyed over a network to a network adapter coupled to a computing device having a system memory associated therewith, the method comprising:
- generating in the system memory at least one queue of one or more descriptors, each such descriptor indicating a disposition of the data contained in the messages to be received over the network;
- fetching or prefetching at least one of the descriptors from the at least one queue in the system memory to a cache memory in the network adapter;
- receiving at least one of the messages at the network adapter; and
- processing the at least one of the received messages at the network adapter so as to cause the data contained therein to be distributed in accordance with the at least one fetched or prefetched descriptor in the cache memory.

18. A method according to claim 17, wherein the at least one of the descriptors indicates a location in the system memory, and wherein processing the at least one of the received messages comprises writing the data contained in the at least one of the received messages to the location in the system memory indicated by the at least one of the descriptors.

19. A method according to claim 18, wherein the at least one of the descriptors comprises a scatter list comprising a plurality of scatter entries, each such scatter entry indicating a range of addresses in the system memory, and wherein writing the data comprises scattering the data contained in the at least one of the received messages to the addresses indicated by the scatter entries.

20. A method according to claim 19, wherein the at least one of the received messages comprises a sequence of packets containing the data, and wherein scattering the data comprises scattering the data contained in each of the packets in the sequence to the addresses indicated by the scatter entries.

21. A method according to claim 18, wherein writing the data comprises writing the data to the addresses indicated by the scatter entries by direct memory access (DMA).

22. A method according to claim 17, wherein processing the at least one of the received messages comprises determining whether the at least one of the descriptors in the cache memory is a valid descriptor for processing the at least one of the received messages, and if not, fetching a further one of the descriptors for use in processing the at least one of the received messages.

23. A method according to claim 17, wherein prefetching the at least one of the descriptors comprises prefetching a succeeding one of the descriptors from the at least one queue for use in processing a subsequent one of the messages, before the subsequent one of the messages is received by the adapter.

24. A method according to claim 17, wherein receiving the messages comprises receiving the messages on a plurality of transport service instances, and wherein generating the at least one queue comprises generating multiple queues, which are associated respectively with different ones of the transport service instances, and wherein prefetching the at least one of the descriptors comprises prefetching the descriptors from the multiple queues to the cache memory, so that the cache memory holds one of the descriptors for each of two or more of the transport service instances.

25. A method according to claim 24, wherein the network comprises a switch fabric, and wherein the transport services instances comprise queue pairs used by the computing device in communicating over the switch fabric, and wherein the descriptors comprise work queue elements placed in the queues by the computing device.

26. A method according to claim 24, and comprising loading context information into the cache memory with respect to each of the two or more of the transport service instances, for use in processing the at least one of the received messages.

27. A method according to claim 24, wherein loading the context information comprises providing an indication as to whether the descriptor in the cache memory is a valid descriptor for processing the at least one of the received messages on that one of the transport service instances.

28. A method according to claim 17, wherein generating the at least one queue comprises placing the descriptors in a cyclic buffer.

29. A method according to claim 17, wherein generating the at least one queue comprises placing the descriptors in a linked list.

* * * * *